Oct. 16, 1923.  
P. C. DONNER  
1,470,714  
PELT OR SKIN DEHAIRING MACHINE  
Filed Dec. 31, 1921  6 Sheets-Sheet 4

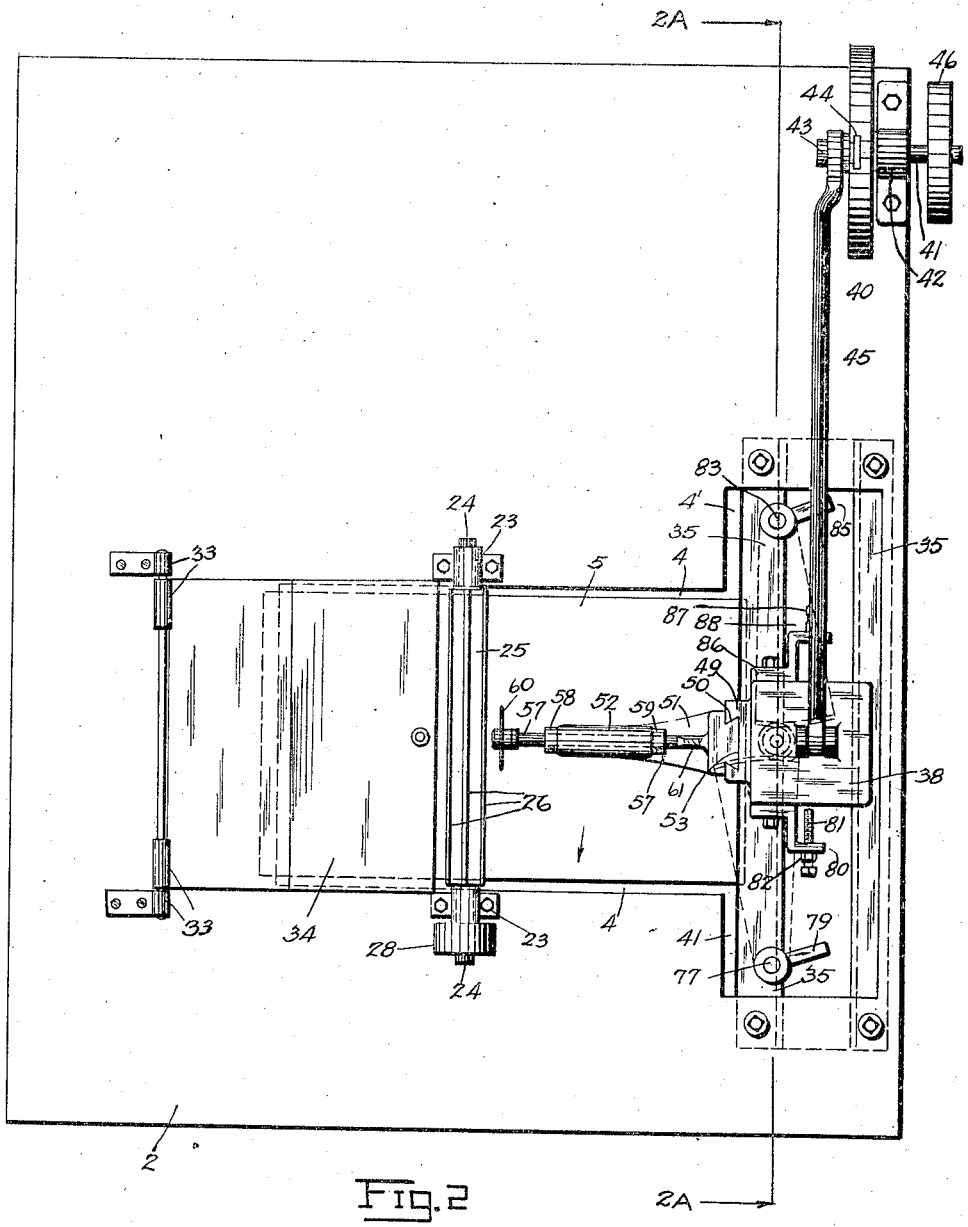

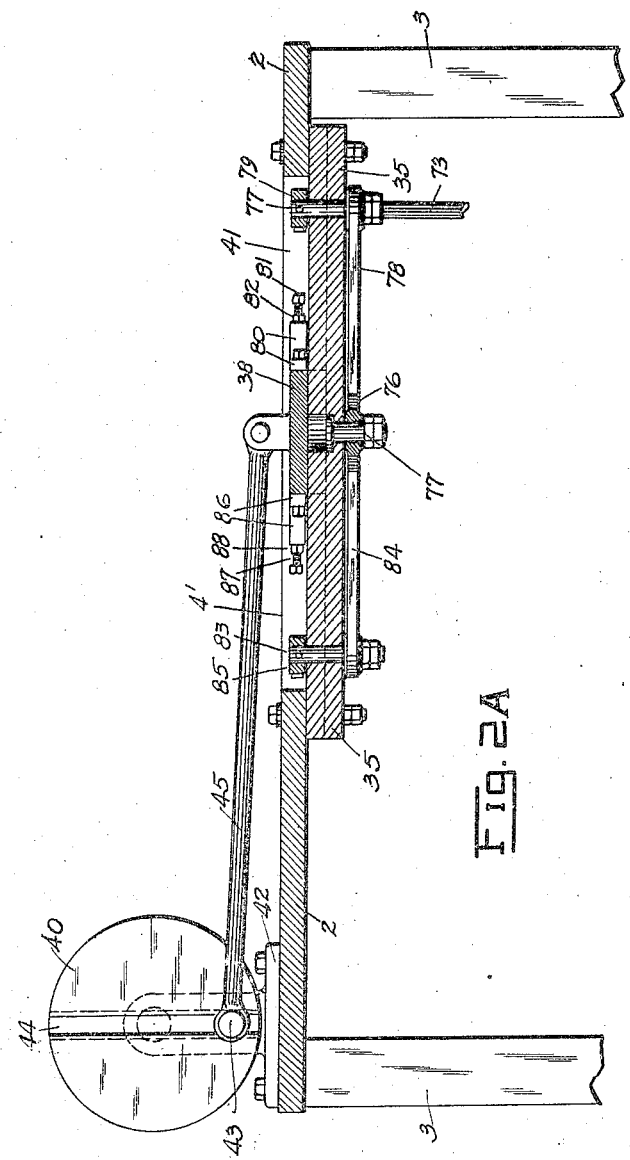

PHILIP C. DONNER
INVENTOR:

Fraentzel and Richards
BY
ATTORNEYS

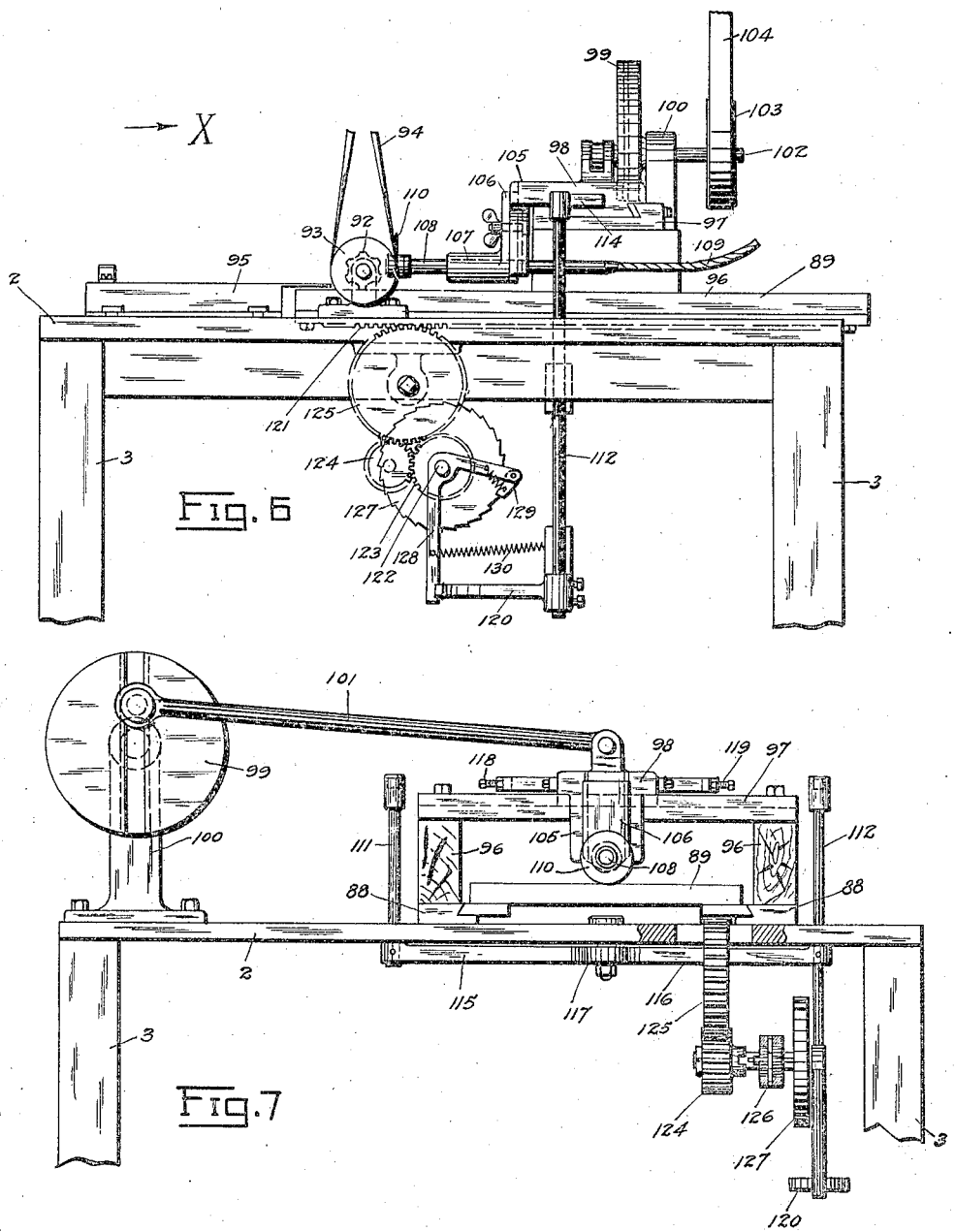

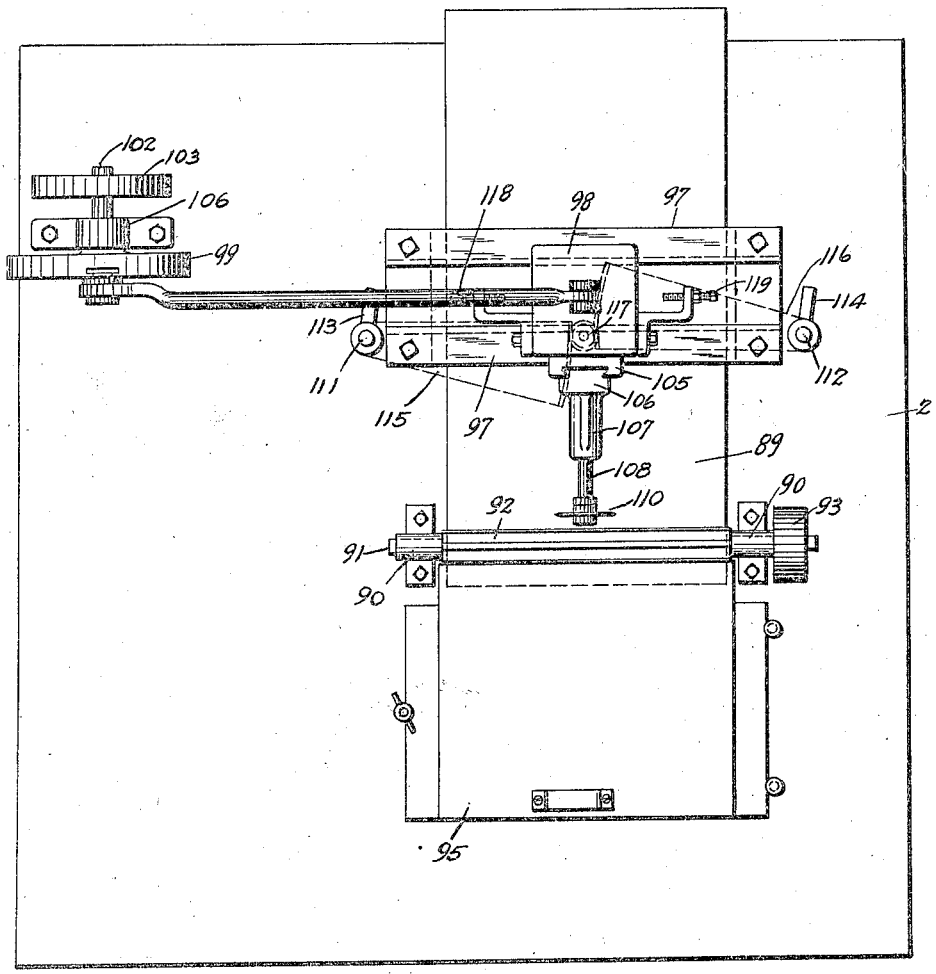

Patented Oct. 16, 1923.

1,470,714

UNITED STATES PATENT OFFICE.

PHILIP C. DONNER, OF SUMMIT, NEW JERSEY.

PELT OR SKIN DEHAIRING MACHINE.

Application filed December 31, 1921. Serial No. 526,341.

*To all whom it may concern:*

Be it known that I, PHILIP C. DONNER, a citizen of the United States, residing at Summit, in the county of Union and State of New Jersey, have invented certain new and useful Improvements in Pelt or Skin Dehairing Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to that class of machines employed for the purpose of dehairing pelts or skins; and, the present invention has reference, more particularly, to a novel and simply constructed machine or apparatus comprising an intermittently movable support, either in the form of a rotatable drum or a horizontally disposed table, upon which a pelt or skin, or pieces of such, are adapted to be mounted, with the fur or hair-side of the pelt or skin extending outwardly or away from the surface of the support, and a rapidly rotating and transversely moving cutter, for rapidly and closely cutting the fur or hair from the pelt or skin, or from the pieces thereof.

The present invention, has for its principal object to provide a novel and simply constructed apparatus for the purposes hereinabove stated, which is most efficient in its operation, and which is just as readily adaptable for the reception and dehairing of full-sized pelts or skins, as it is for the reception and dehairing of small pieces of pelts or skins.

The invention has for its further object to provide a fur or hair-cutting machine in which the cutting of the fur or hair is done, so that the cutting operation is at all times under the direct observation of the operator, whereby the latter can readily see whether the fur or hair is being properly severed from the pelt or skin, and to enable him to make a quick and proper adjustment of the rotary cutter, should the latter be cutting too deep, or not deep enough.

Other objects of the present invention not at this time more particularly enumerated will be clearly understood from the following detailed description of the present invention.

With the various objects of the present invention in view, the said invention consists, primarily, in the novel apparatus for dehairing pelts or skins; and, the said invention consists, furthermore in the novel arrangements and combinations of the several devices and parts, as well as in the details of the construction of the same, all of which will be more fully described in the following specification, and then finally embodied in the clauses of the claims, which are appended to, and which form an essential part of the said specification.

The invention is clearly illustrated in the accompanying drawings, in which:—

Figure 2 is a top or plan view of the same; and Figure 2ᴬ is a transverse section taken on line 2ᴬ—2ᴬ in said Figure 2.

Figure 4:
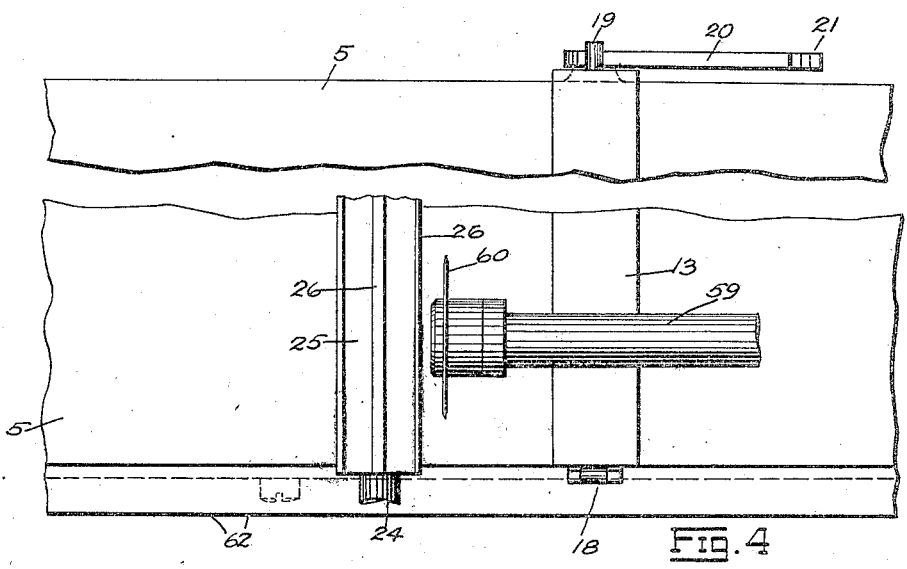
Figure 5:
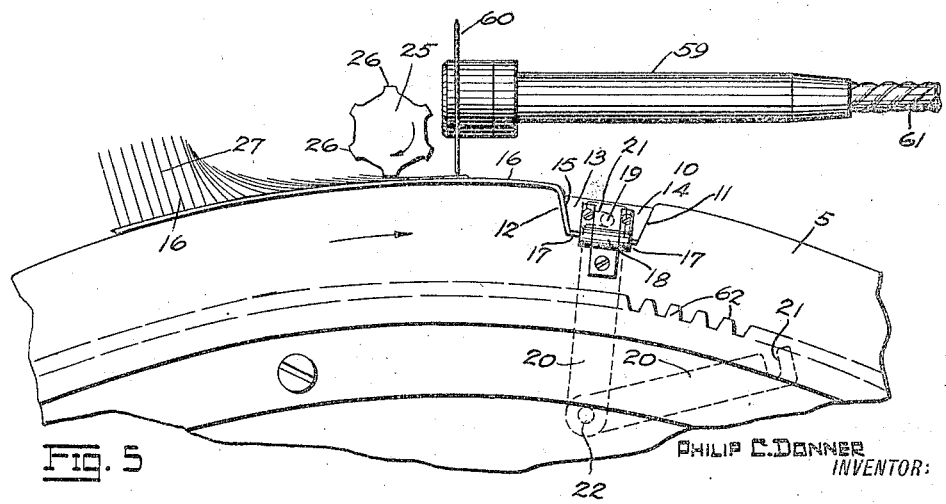

Figure 4 is a detail plan view of a fragmentary portion of the intermittently moving support, and means for clamping a pelt or skin, or a piece of pelt or skin, in position upon said support, said view also showing in connection therewith, one position of the rotary cutter, and a portion of a rotary fur or hair-laying element or brush, to bring certain portions of the fur or hair in proper position for cutting; and Figure 5 is a side view of the various devices and parts shown in said Figure 4, both of said views being made on an enlarged scale.

Figure 6 is a side elevation of a modified construction of apparatus for dehairing pelts or skins, said apparatus still embodying the main features and principles of the present invention; Figure 7 is another view of the same, looking in the direction of the arrow *x* in said Figure 6; and Figure 8 is a plan view of said modified construction.

Similar characters of reference are employed in all of the above described views, to indicate corresponding parts.

Referring now more particularly to Figures 1 to 5 inclusive of the drawings, in which is shown one form of apparatus made according to and embodying the principles of the present invention, the reference-character 1 indicates a complete apparatus in which the pelt or skin-supporting element is of the rotary type.

Figure 1:
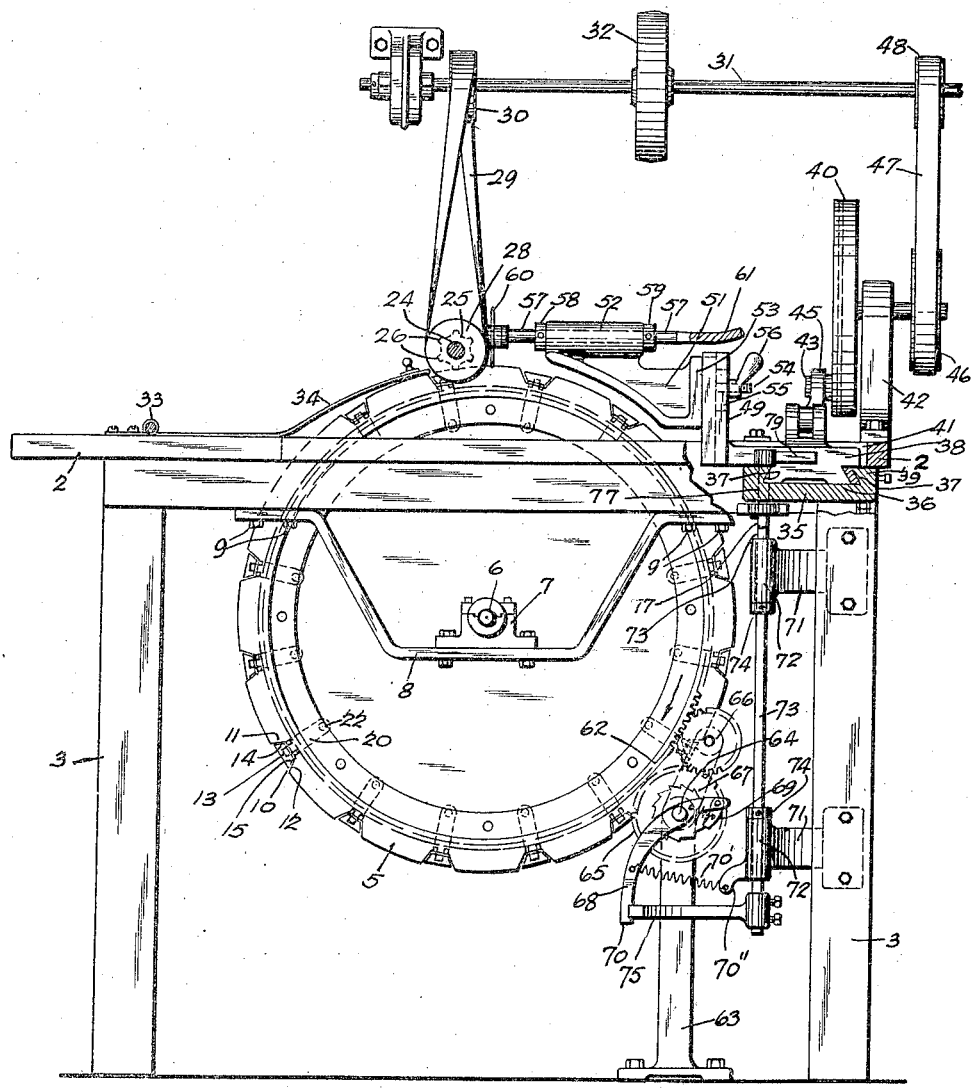
Figure 1 is a side elevation of an apparatus for dehairing pelts or skins, showing one embodiment of the principles of the present invention.
Figure 3:
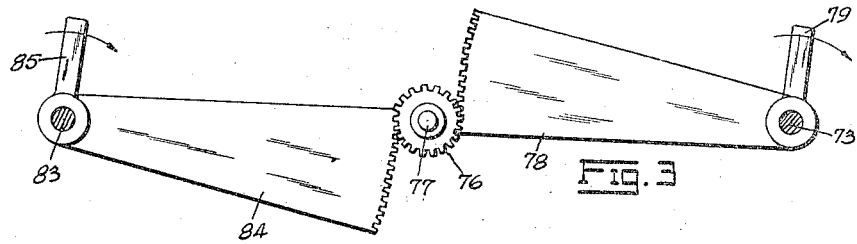
Figure 3 is a detail plan view of a pair of toothed sectors and an actuating pinion, forming part of the mechanism for producing an intermittent or step by step movement of the support upon which the pelts or skins are adapted to be secured, said view being drawn on an enlarged scale.

This form of apparatus, as will be seen from an inspection of said figures of the drawings, comprises a suitable table, as 2, mounted upon suitable legs or standards, as 3, adapted to be suitably bolted or otherwise secured to the floor. As indicated, the said table 2 is made, in the proper location, with an opening, as 4, in which is rotatably disposed a suitably constructed drum or wheel 5, the axle 6 of which is journalled, at its respective ends, in bearings 7, carried by straps, as 8, which are secured by means of lag-screws or bolts 9 to the under side of the table 2, and extend downwardly therefrom, substantially as shown in Figure 1 of the drawings. It will be understood, however, that the said drum may be otherwise suspended or mounted in its operative relation to the table, and to the mechanism to be hereinafter more fully set forth, if desired. In its peripheral surface, the said drum or wheel 5 is made with a series of suitably disposed and laterally extending channels or depressions, as 10, the laterally extending side-walls 11 and 12, of which are preferably tapered in a manner more particularly shown in Figures 1 and 5 of the drawings.

Disposed within each channel or depression 10 is a laterally extending clamping element or bar 13, the sides 14 and 15 of which are tapered to correspond to said tapered side-walls 11 and 12. The width of each clamping element or bar 13 is slightly less than the width of the channel or depression in which said bar lies, for the reception and clamping between the side-walls 11 and 14 of an end or edge 17 of a pelt or skin 16, as will be evident from an inspection of said Figure 5. One end-portion of each clamping element or bar 13 is connected at or near one edge of the drum or wheel with a suitably constructed hinge-member or element 18, which permits of the clamping element or bar 13 to be lifted from or lowered down into its receiving channel or depression 10, as will be clearly evident. To secure each clamping element or bar in its lowered position in the corresponding channel or depression 10, and to securely clamp the end or edge 17 of the pelt or skin 16 in place, each clamping element or bar 13 is provided at its opposite end with a pin 19 with which the slotted receiving portion 21 of an arm 20, pivotally secured by means of a pin or screw, as 22, upon the other side of the drum or wheel, can be brought into separable tightening or holding engagement. Of course, it will be evident that for each clamping element or bar 13, there is a correspondingly placed retaining or holding arm 20. As shown, the table 2 has also suitably fixed upon its upper surface a pair of bearings 23, see Figure 2 of the drawings, of sufficient height to receive a laterally extending shaft 24 for the proper disposition above the said drum or wheel 5 of a rotary hair-laying element or brush 25 which is suitably mounted upon said shaft 24 and is adapted to revolve with said shaft in the manner and for the purposes to be presently described. The said hair-laying element or brush 25, in general, is cylindrically formed, being preferably provided upon its cylindrical surface with longitudinally extending projecting members or ribs, as 26, so as to provide a fluted member, whose ribs are brought in contact with the fur or hairs 27 of the clamped pelt or skin 16, substantially as illustrated in Figure 5 of the drawings. Rotary motion of the said shaft 24 and the hair-laying element or brush 25 is produced by a pulley 28 suitably mounted upon said shaft 24, and a belt 29 passing over a driving pulley 30 mounted upon a main driving shaft 31 which is suitably driven from a pulley wheel 32. Said shaft 24 and the said hair-laying element or brush 25, however, may be driven from any other suitably constructed and suitably disposed source of power, as will be clearly evident.

Secured by a hinge-connection 33 to the table 2, in the rear of that portion of said drum or wheel 5 exposed above the surface of said table 2, is a forwardly extending shield or apron 34, which, when in operative position, extends over that portion of said exposed surface of the drum or wheel 5 which lies rearwardly of the hair-laying element or brush 25. Said shield or apron, when in operative position, covers the pelt or skin 16 clamped to the drum or wheel 5 as it approaches the hair-laying element or brush, and serves to receive the hairs severed from the pelt or skin 16 by the cutting elements of the machine, thereby preventing the severed hair or cuttings from intermixing with the unsevered hair or fur of pelt or skin, as the latter moves toward said cutting element. By reason of the hinged connection of said shield or apron 34, the same may be raised or turned back away from the surface of the drum or wheel 5, when access to the latter is desired for the purpose of attaching or clamping more pelts or skins 16 thereto.

The opening 4 of said table 2 is enlarged transversely at a point beyond the drum or wheel 5, as at 4' (see Figure 2 and Figure 2ᴬ). Secured to the table 2, in any suitable manner, so as to extend transversely beneath said enlarged opening 4', is a guide-plate 35, having in its upper surface a guideway or channel 36, the sides of which are undercut, as at 37. Mounted in connection with said guide-plate 35, so as to be reciprocably movable thereon, is a carriage 38 provided on its under side with a slide-member 39 shaped to fit the said guideway or channel 36 and its undercut sides 37. The means for reciprocating said carriage 38 comprises a crank-wheel 40, the shaft or axle 41 of which is journaled in a suitable bearing 42 secured to said table 2 in a suitable location. In order to permit of a variation of the stroke or degree of transverse reciprocal motion permitted to said carriage 38, between maximum and minimum limits, the crank-stud or arm 43 of said crank-wheel 40 is adjustable in a diametrically disposed groove or channel 44 provided in the face of said crank-wheel, as will be understood from an inspection of Figures 1, 2 and 2ᴬ of the drawings. Interconnecting said carriage 38 with the crank-stud or arm 43 of said crank-wheel 40, is a connecting rod 45. Said crank-wheel 40 is rotated by a pulley 46, over which runs a driving belt 47, driven from a pulley 48 fixed on said main driving shaft 31, or said crank-wheel 40 may be driven from any other desired source of power, and through the agency of any other convenient form of power transmission mechanism. Fixed upon the said carriage 38 is a vertical post or standard 49, provided in its forward face with a vertical guide-channel or groove 50 having undercut sides. Mounted on said post or standard 49, so as to be vertically adjustable thereon, is a forwardly projecting bracket 51, having at its free or outer end a longitudinal bearing-block 52. Said bracket 51 is provided on its back or rear side with a vertical guide-rib 53 shaped to correspond to the cross-sectional shape of said guide-channel or groove 50. The means provided for locking said bracket 51 in desired vertically adjusted position relative to said post or standard 49, comprises a rearwardly projecting threaded stud 54, which extends from the rear face of said guide-rib 53 through a longitudinal vertical slot 55 provided in the body of said post or standard 49. A lock or jam-nut 56 engaged upon the free end of said threaded stud 54 serves to bind said bracket to said post or standard in desired vertically adjusted position. Journaled in said bearing-block 52 is a spindle 57, secured against undue longitudinal play by collars 58 and 59, which respectively abut the opposite ends of said bearing block. Secured to the forward end of said spindle 57 is a rotary cutter or knife 60 which revolves in a transverse plane. Said spindle 57 and its cutter or knife 60 is preferably driven by a flexible shaft 61, which is attached or coupled to the rearward end of said spindle 57, and which may be driven from any suitable source of power. It will be understood, that other transmission means may be employed to rotate said spindle and its cutter or knife, and that the flexible shaft above described as used for such purpose is but illustrative of one convenient form of transmission means. It will be evident from the above description, that the cutter or knife 60, as supported by the adjustable bracket 51, may be raised or lowered relative to the surface of the supporting drum or wheel 5, so as to readily adjust the same to the pelt or skin 16 to be dehaired, whereby the depth of the cut may be so controlled as to easily assure a proper and complete severing of the hair from the said pelt or skin. It will also be evident, that owing to the mounting of the cutting mechanism upon the transversely reciprocated carriage 38, the rotary cutter or knife 60 will be moved transversely back and forth across the pelt or skin 16 as supported on the surface of the wheel or drum 5, so that the hair or fur will be removed or severed throughout the entire width of the pelt or skin 16, without necessity of moving the latter or disturbing the same, once it is securely clamped to the wheel or drum 5. If the pelts or skins 16 are of narrow width, the stroke of the transverse cutter or knife 60 may be shortened, by adjusting the crank stud or arm 43 on the crank wheel 40 to reduce the throw thereof, and thereby correspondingly reducing the length of travel imparted to the carriage 38, and if wider pelts or skins are to be operated upon, the stroke of the crank devices may be increased to correspondingly increase the length of travel imparted to said carriage 38, as will be understood from the foregoing description and an inspection of the accompanying drawings.

It is desirable, during the transverse movement of the cutter or knife 60 across the pelt or skin 16, that the supporting wheel or drum 5 be held immovable, but upon the completion of the transverse strokes of said cutter or knife 60, in each direction, a forward feeding rotary impulse shall be imparted to said wheel or drum 5, whereby the pelt or skin supported by the latter will be intermittently fed forward at the end of each cutting stroke, and whereby succeeding portions of the unsevered hair or fur carried by the pelt or skin 16 will be presented to the cutting action of the cutter or knife 60. The means for producing the properly timed intermittent forward rotation of said wheel or drum 5, comprises, preferably, a novel transmission means actuated by the carriage 38 as the latter approaches the end of its stroke or travel in each direction. This transmission means comprises a flange-gear 62 secured upon one end of said wheel or drum 5. Mounted in suitable bearing-standards 63 is a transverse shaft 64 upon which is fixed a driving gear 65. Said driving gear 65 transmits rotary motion, in a proper direction, to said wheel or drum 5 through an intermediate idler-gear 66 which is in mutually meshed relation to said driving gear 65 and flange-gear 62. Fixed on said shaft 64, in a suitable location, is a ratchet wheel 67. Pivotally mounted on said shaft 64, adjacent to said ratchet wheel 67 is a lever-arm 68, to one end of which is attached a spring-pressed dog or pawl 69, which operatively engages said ratchet wheel 67. The opposite end of said lever-arm 68 terminates in a downwardly projected tail-piece 70. Mounted beneath the table 2, e. g., in connection with certain of the legs 3 thereof, are brackets 71 vertically spaced one above the other, the same having vertical bearing-portions 72 vertically alined one with another. Rotatably mounted in said bearing-portions 72 is a vertical shaft 73, which is secured against longitudinal displacement by collars 74 which abut said bearing-portions. Secured to the lower end of said vertical shaft 73 is a tappet-arm or cam-device 75 which is oscillated by said shaft 73 in a horizontal plane. Affixed to the upper end of a shaft 77 is a spur gear 76. Journaled in one end of said guide-plate 35 is said vertical spindle 73, to which is secured a segment gear 78, the teeth of which mesh with the teeth of said spur gear 76, at one side of the latter; said segment gear, as thus disposed extends beneath the guide-plate 35, and swings in a horizontal plane. Affixed to the upper end of said spindle 73 is a tappet-arm 79. Attached to one end of said carriage 38, by means of a suitable supporting bracket 80, is an adjustable abutment member comprising a threaded stud 81, adapted to be secured in desired adjusted projected position by a lock-nut 82. Journaled in the opposite end of said guide-plate 35 is another vertical spindle 83, to the lower end of which is secured a segment gear 84, the teeth of which mesh with the teeth of said spur gear 76, at the opposite side of the latter; said segment gear 84, as thus disposed, extends beneath the guide-plate 35, and also swings in a horizontal plane. Affixed to the upper end of said spindle 83 is a tappet-arm 85. Attached to the opposite end of said carriage 38, by means of a suitable supporting bracket 86, is an adjustable abutment member also comprising a threaded stud 87, adapted to be secured in desired adjusted projected position by a lock-nut 88.

Briefly the operation of the machine is as follows:—

A pelt or skin 16 having been attached to the wheel or drum 5 by the clamp-bar 13, and the rotatable cutter or knife 60 having been set in motion, power is transmitted to the carriage 38 to reciprocate the same on the guide-plate 35. The hair-laying element 25, by its rotation, will brush or lay over the hair or fur of the pelt or skin as it approaches the cutter or knife 60, whereby the hair or fur is laid over or folded down rearwardly so that the free ends of the same project rearwardly away from the cutter or knife, and so that the bodies of the hair or fur are projected in substantially horizontal plane, whereby the hairs or fur are so held that only the base or inner ends of the same, close to the surface of the skin or hide, are presented to the cutting action of the cutter or knife, and consequently the hair or fur is severed very close to the skin or hide of the pelt, therefore assuring not only a clean dehairing of the pelt or skin 16, but also assuring substantially full lengths of severed hairs or fur. Not only does the rotary hair-laying element 25 thus position the hair or fur in the most advantageous position for cutting the same, but the rotary movement of the hair-laying element 25 tends also to sweep back upon the apron or shield 34 the severed hair or fur so that the same may be quickly removed as it accumulates as a result of the dehairing operation.

In order to assure the automatic feeding of the pelt or skin 16 to the transversely reciprocated rotary cutter or knife 60, while at the same time holding the pelt or skin stationary during the cutting strokes of said cutter or knife, the means above described for intermittently producing a slight forward feeding movement or rotation of the supporting wheel or drum 5 at the end of each transverse stroke of the cutter or knife 60 is provided. This means operates as follows:—

The carriage 38, when moved in one direction by its actuating mechanism, carries the rotating cutter or knife 60 across the pelt or skin, the wheel or drum dwelling in stationary or immovable poise during such operation. As the carriage reaches the end of its stroke, in one direction, the threaded stud or abutment member 81, at one end of the carriage thrusts against the tappet-arm 79, thereby rotating the segment gear 78 in one direction, so that said segment gear 78 turns the spur gear 76, and through it partially rotates the vertical shaft 73. This partial rotation of the shaft 73 swings the cam-device 75 into a passing operative engagement with the tail-piece 70 of the lever-arm 68 to swing the latter on its fulcrum, and thereby causing the dog or pawl 69 to actuate the ratchet wheel 67 to rotate the shaft 64 and gears 65 and 66 to transmit a slight forward rotary feeding movement to the drum or wheel 5 through the flange-gear 62, thus advancing the pelt or skin 16 toward the cutter or knife to position the adjacent unsevered hairs or fur in the path of the said cutter or knife 60. As the cam-device passes away from said tail-piece 70, the lever-arm 68 and its dog or pawl 69 are retrieved to normal initial position by a pull-spring 70' which is interconnected between said tail-piece 70 and a stationary anchoring point, such as the lug 70" on the adjacent bearing-portion 72 of the shaft 73. The above described operations are completed as the carriage 38 completes its stroke, so that as the reverse unsevered hair or fur of the pelt or skin 16 is in position to be engaged by the cutter or knife 60 as it is carried through the reverse or opposite transverse movement. As the carriage 38 approaches the end of the reverse or opposite stroke, the threaded stud or abutment member 87, at the opposite end of the carriage, thrusts against the tappet-arm 85, thereby rotating the segment gear 84, so that said segment gear turns the spur gear 76 and the shaft 73 with a reverse rotation, whereby the cam-device 75 is turned to swing back, and in so doing is again carried into a passing operative engagement with the tail-piece 70 of the lever arm 68, and consequently the dog or pawl 69 again actuates the ratchet wheel 67, shaft 64, and gears 65 and 66, to again transmit through the flange-gear 62 another forward rotary feeding impulse to said wheel or drum 5, as the carriage 38 and the cutter or knife 60 completes said reverse or opposite stroke. Since the respective segment gears 78 and 84 are continuously engaged with opposite sides of said spur gear 76, it follows that as one segment gear is actuated through its tappet-arm in an operative direction, the opposite segment gear is actuated through the rotation of the spur-gear 76 to return the same and its tappet-arm to a normal initial position, ready for the next operative engagement thereby of the associated abutment element of the carriage. From the above description it will be clear that the shaft 73 is oscillated intermittently to produce through the intermediate transmission mechanism intermittent forward feeding movements of said wheel or drum 5.

Referring now to Figures 6, 7 and 8, there is illustrated therein a modified arrangement of the novel dehairing machine, which nevertheless embodies basically the general principles of this invention. In the modified construction of the machine, as shown in said Figures 6, 7 and 8, the main difference or change in structure resides in the form of the pelt or skin-supporting and feeding means, since in place of the rotary wheel or drum 5 heretofore described, there is employed a flat longitudinally movable supporting plate or bed, slidably mounted on the table 2. In said modified structure, the table 2 is provided with a pair of longitudinally disposed laterally spaced and opposed guide-rails 88, for movably supporting and guiding the flat plate or bed 89. Fixed upon said table 2, one at each side of the plate or bed 89, are laterally opposed bearings 90 of sufficient height to journal a laterally extending shaft 91 for carrying a rotary hair-laying element or brush 92 properly disposed above the plate or bed 89. Said shaft 91 is provided with a driving pulley 93 over which runs a driving belt 94. Arranged upon said table 2, to the rear of said hair-laying element or brush 92, is a suitable shield or apron 95, beneath which said movable plate or bed 89 passes. Mounted upon supporting blocks or posts 96, so as to be elevated thereby above said movable plate or bed-guideway, is a transverse guide-plate 97, in which is slidably mounted for transverse movements thereon, a carriage 98. A crank-wheel 99, journaled in a bearing standard 100 fixed on the table 2, transmits through the connecting-rod 101, the desired reciprocatory transverse movement to said carriage 98. The shaft 102 of said crank-wheel is provided with a pulley 103 over which runs the driving belt 104, or the same may be driven from a suitable source of power, through any other convenient transmission means. Said carriage 98 is provided with a rearward extension 105, which overhangs the guide-plate 97, and to which is secured a bracket 106 provided with a bearing 107. Journaled in said bearing 107 is a spindle 108, to the tail of which is fixed a flexible driving shaft 109. Secured to the free rearwardly projecting end of said spindle 108 is a rotary cutter or knife 110. When the carriage is reciprocated the said rotary cutter or knife will be likewise reciprocated transversely across the plate or bed 89, to sever the hair from the pelt or skin attached to said plate or bed and fed thereby beneath the hair laying element 92 into operative relation to said cutter or knife.

In order to provide for an operative intermittent forward feeding movement of said plate or bed 89, to slightly feed forward a pelt or skin after each cutting stroke of the cutter or knife 110, there is provided a pair of vertical shafts 111 and 112, the shaft 112 extending downwardly beneath the table 2. Said shafts 111 and 112 are respectively positioned adjacent to the respective ends of said guide-plate 97, and are respectively provided at their upper ends with the tappet-arms 113 and 114. Secured respectively on said shafts 111 and 112 are segment gears 115 and 116 which respectively intermesh with an intermediate idler spur gear 117. The carriage 98 is provided at its respective ends with adjustable abutment members 118 and 119, which cooperate with said tappet-arms 113 and 114 to oscillate said vertical shafts 111 and 112, whereby the latter oscillates a cam-device 120. Fixed upon the underside of the plate or bed 89 is a toothed rack 121. Mounted on a lay-shaft 122 is a driving gear 123, which transmits forward motion through the intermediate transmission gears 124 and 125 and the rack 121, to said plate or bed 89. Said driving gear 123 is preferably loose on said lay-shaft 122, but may be coupled in driven relation thereto by a shift-clutch means 126. Fixed on said lay-shaft 122 is a ratchet wheel 127. Pivoted on said lay-shaft 122 adjacent to said ratchet-wheel 127 is a bell-crank lever 128, the upper arm of which carries a pawl or dog 129 which operatively engages said ratchet wheel. The lower arm of said bell-crank lever is engageable by said cam-device 120, so as to be operated by the movement of the latter. A spring-means 130 holds said bell-crank lever 128 subject to the operation of said cam-device 120. As will be understood, the carriage 98 at the end of its transverse strokes, moves one or the other of its abutment members 118 or 119 into engagement with one or the other of said tappet-arms 113 and 114, to oscillate or rotate through the segment gear-arrangement the shaft 112, first in one direction and then in the opposite direction, thereby causing the cam-device 120 to pass back and forth in operative engagement with said bell-crank lever 128, to thus impart an intermittent rotative movement to said ratchet wheel 27 and through the lay-shaft 122 and transmission gearing to said plate or bed 89, thereby producing the desired intermittent forward feeding movement of the latter, in much the same manner and for the same purpose as the rotary support or drum 5 of the previously described construction was operated.

From the above description it will be clear, that the modified construction of apparatus immediately above described operates, in principle, in substantially the same manner as does the first described construction, so far as the cutting operations are concerned, and that the difference pointed out between the two types of construction, are only such as permits the use of a flat feed-support or table in place of the rotary support or drum 5 of said first described construction.

I am aware that some changes may be made in the various arrangements and combinations of the several devices and parts, as well as in the details of the construction thereof, without departing from the scope of this invention as above described, and as defined in the appended claims. Hence, I do not limit my invention to the exact arrangements and combinations of said devices and parts as described in the foregoing specification, nor do I confine myself to the exact details of the construction of said parts as illustrated in the accompanying drawings.

I claim:—

1. In a machine for dehairing pelts and skins, a pelt or skin-support, a rotary cutting element, means for reciprocating said cutting element transversely over said support, a hair-laying element in the rear of said cutting element and above said support, and means for moving said support to carry a pelt or skin beneath said hair-laying element into operative relation to said cutting element.

2. In a machine for dehairing pelts or skins, a pelt or skin-support, a rotary cutting element, means for reciprocating said cutting element transversely over said support, a hair-laying element in the rear of said cutting element and above said support, and means for intermittently moving forward said support upon the completion of a cutting stroke of said cutting element.

3. In a machine for dehairing pelts or skins, a pelt or skin-support, means for securing a pelt or skin to said support, a rotary cutting element, means for reciprocating said cutting element transversely over said support, a hair-laying element in the rear of said cutting element and above said support, and means for moving said support to carry a pelt or skin beneath said hair-laying element into operative relation to said cutting element.

4. In a machine for dehairing pelts or skins, a pelt or skin-support, means for securing a pelt or skin to said support, a rotary cutting element, means for reciprocating said cutting element transversely over said support, a hair-laying element in the rear of said cutting element and above said support, and means for intermittently moving forward said support upon the completion of a cutting stroke of said cutting element.

5. In a machine for dehairing pelts or skins, a pelt or skin-support, a rotary cutting element, means for reciprocating said cutting element transversely over said support, and means for moving said support toward said cutting element.

6. In a machine for dehairing pelts or skins, a pelt or skin-support, a rotary cutting element, means for reciprocating said cutting element transversely over said support, means for adjusting said cutting element toward or away from said support, and means for moving said support toward said cutting element.

7. In a machine for dehairing pelts or skins, a pelt or skin-support, a rotary cutting element, means for reciprocating said cutting element transversely over said support, means for adjusting said cutting element toward or away from said support, and means for intermittently moving forward said support upon the completion of a cutting stroke of said cutting element.

8. In a machine for dehairing pelts or skins, a pelt or skin-support, a rotary cutting element, means for reciprocating said cutting element transversely over said support, means for adjusting said cutting element toward or away from said support, a rotary hair-laying element extending transversely across said support in the rear of said cutting element, and means for intermittently moving forward said support upon the completion of a cutting stroke of said cutting element.

9. In a machine for dehairing pelts or skins, a pelt or skin-support, clamp-means for securing a pelt or skin to the surface of said support, a rotary cutting element, means for reciprocating said cutting element transversely over said support, means for adjusting said cutting element toward or away from said support, a rotary hair-laying element extending transversely across said support in the rear of said cutting element, and means for intermittently moving forward said support upon the completion of a cutting stroke of said cutting element.

10. In a machine for dehairing pelts or skins, a pelt or skin-support, a rotary cutting element, means for reciprocating said cutting element transversely over said support, a rotary hair-laying element extending transversely across said support in the rear of said cutting element, a shield spaced above and extending over said support in the rear of said hair-laying element, and means for intermittently moving forward said support upon the completion of a cutting stroke of said cutting element.

11. In a machine for dehairing pelts or skins, a pelt or skin-support, a clamp-means for securing a pelt or skin to the surface of said support, a rotary cutting element, means for reciprocating said cutting element transversely over said support, a rotary hair-laying element extending transversely across said support in the rear of said cutting element, a shield spaced above and extending over said support in the rear of said hair-laying element, and means for intermittently moving forward said support upon the completion of a cutting stroke of said cutting element.

12. In a machine for dehairing pelts or skins, a pelt or skin-support, a rotary cutting element, means for reciprocating said cutting element transversely over said support, means for adjusting said cutting element toward or away from said support, a rotary hair-laying element extending transversely across said support in the rear of said cutting element, a shield spaced above and extending over said support in the rear of said hair-laying element, and means for intermittently moving forward said support upon the completion of a cutting stroke of said cutting element.

13. In a machine for dehairing pelts or skins, a pelt or skin-support, a clamp-means for securing a pelt or skin to the surface of said support, a rotary cutting element, means for reciprocating said cutting element transversely over said support, means for adjusting said cutting element toward or away from said support, a rotary hair-laying element extending transversely across said support in the rear of said cutting element, a shield spaced above and extending over said support in the rear of said hair-laying element, and means for intermittently moving forward said support upon the completion of a cutting stroke of said cutting element.

14. In a machine for dehairing pelts or skins, a pelt or skin-support, a cutting means, said pelt or skin support being movable toward said cutting means, and a rotary and fluted hair-laying element in the rear of said cutting means adapted to fold or lay down the hair rearwardly to expose the base of the hair of the pelt or skin to the cutting action of said cutting means.

15. In a machine for dehairing pelts or skins, a pelt or skin-support, a cutting means, said pelt or skin support being movable toward said cutting means, and a rotary and fluted hair-laying element in the rear of said cutting means adapted to fold or lay down the hair rearwardly to expose the base of the hair of the pelt or skin to the cutting action of said cutting means, and means for intermittently moving said support toward said hair-laying element and said cutting means.

In testimony that I claim the invention set forth above I have hereunto set my hand this 27 day of December 1921.

PHILIP C. DONNER.

Witnesses:
 FRED'K C. FRAENTZEL,
 EVA E. DESCH.